United States Patent
Price

[11] Patent Number: 6,053,477
[45] Date of Patent: Apr. 25, 2000

[54] SELF LEVERING VEHICLE JACK

[76] Inventor: Danny C. Price, 760 W. Alameda, #32, Pocatello, Id. 83201

[21] Appl. No.: 09/025,173

[22] Filed: Feb. 18, 1998

[51] Int. Cl.[7] .................................................. F16M 13/00
[52] U.S. Cl. ............................................................ 254/94
[58] Field of Search .......................... 254/94, 422, 93 H, 254/100, 103, DIG. 3

[56] References Cited

U.S. PATENT DOCUMENTS

| | | |
|---|---|---|
| 1,213,994 | 1/1917 | Anderson . |
| 1,268,101 | 6/1918 | Drew . |
| 1,955,649 | 4/1934 | Nuccio ........................ 254/94 |
| 2,012,554 | 8/1935 | Travis ......................... 254/94 |
| 2,075,934 | 4/1937 | Gold . |
| 2,108,888 | 2/1938 | Gunter . |
| 2,201,373 | 5/1940 | Miniconi . |
| 2,240,430 | 4/1941 | Willard . |
| 2,348,743 | 5/1944 | McCue . |
| 3,733,051 | 5/1973 | Bollinger .................... 254/94 |
| 3,744,757 | 7/1973 | White et al. ................ 257/94 |
| 4,369,989 | 1/1983 | Mankey . |
| 5,215,289 | 6/1993 | Jacobson .................... 254/94 |
| 5,228,651 | 7/1993 | Warner ....................... 254/94 |

*Primary Examiner*—Robert C. Watson
*Attorney, Agent, or Firm*—Robert L. Shaver; Frank J. Dykas

[57] ABSTRACT

A vehicle jack which operates by leverage using the motion of the vehicle to lift an axle of the vehicle into the air. The jack has an outer tube which telescopes over an inner tube, and is adjustable for height. A base plate attached to the tubes grips the road surface with a rubber surface or with optional spike projections. An axle contact surface partially surrounds the axle, or is bolted with a U bolt to the axle.

12 Claims, 5 Drawing Sheets

SELF LEVERING VEHICLE JACK

BACKGROUND OF THE INVENTION

1. Field of the Invention

The present invention generally relates to vehicle jacks, and more particularly to vehicle jacks which raise part of a vehicle using the motion of the vehicle itself.

2. Background Information

It is standard practice for vehicles to carry a jack of some type to lift the wheel of the vehicle far enough off of the ground to enable the operator to change a wheel in case of a flat tire. The jacks typically used with vehicles are of the bumper jack variety, which uses a lever arm and a notched bar to raise the jacking hook; scissors jacks, in which a screw brings the corner of a scissoring parallelogram together to raise the jack and the vehicle, or hydraulic jacks. All of these types of jacks involve a certain degree of physical exertion, due to the necessity of cranking on a scissors jack, pumping the handle of a hydraulic jack, or using the handle of a bumper type jack. What is needed is a vehicle jack which is placed on the axle of a vehicle and which uses energy generated by the vehicle engine to lift the vehicle. In this way, the operator would merely have to place the jack in position, and then use the vehicle to jack itself up. This type of jack would also have no moving parts. This is accomplished by a jack which fits under the axle of a vehicle, and when the vehicle is driven a short distance, uses leverage to lift the axle on which it is positioned into the air.

Accordingly, it is an object of the invention to provide a jack which utilizes the motion of the vehicle to lift the vehicle into the air.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The foregoing and other objects and advantages are attained by a vehicle jack which lifts any one wheel of a vehicle using leverage, in response to the movement of the vehicle in relation to the road surface on which the vehicle is located. The vehicle jack of the invention is removable from contact with the vehicle axle, and therefore can be easily stored when not in use. Thus, one jack can be used for lifting any of the wheels of the vehicle.

The vehicle jack includes an inner support tube which is preferably a square tube of steel, which is generally straight. It includes height selection holes, through which a height selection pin can pass from one side of the tube to the other. The inner support tube and other parts of the vehicle jack, unless specifically identified otherwise, are preferably made of steel or another metal with properties similar to steel, in terms of strength. The vehicle jack also has a base plate which is attached to an end of the inner support tube. The base plate has a road contact surface for non-slipping contact with the road surface. The base plate also has a pair of hinge connection brackets to which the inner support tube is attached to the base plate by a nut and bolt. The vehicle jack also includes an outer support tube, which is also straight, and a square tube in cross-section. It fits over the inner support tube and also has height selection holes which can be aligned with the height selection holes of the inner support tube. It also includes a handle for height adjustment and carrying, and in use links with the inner support tube to form a straight arm which is positioned by rotation directly below an axle of a vehicle for lifting the vehicle or its axle. The vehicle jack also includes an axle contact bracket which is curved to fit the shape of the axle, and is connected to the outer support tube. It's purpose is to contact the axle of the vehicle and rotate from a non-support position to a support position directly under the axle. The vehicle jack also has a height selection pin, which can be inserted through the height selection holes of the inner support tube and the outer support tube, when those holes are in alignment. The height selection pin has a locking device, which typically would be a hole in the end of the bolt, with a securing key or pin which goes through the hole.

The vehicle jack described above can also include removable spike projections which mount on the base plate and provide increased resistance to slipping on a road surface, such as when a road surface is icy, wet, muddy or gravel. The base plate can also have a rubber road contact surface. The axle support bracket can comprise a flat surface with bolt holes which clamps on to the axle by the use of a U-shaped bolt, which surrounds the axle and bolts to the flat axle support bracket.

The vehicle jack can also be utilized with a wheel chock, which is placed in front of an axle which is not being lifted, and which prevents over rotation of the vehicle axle over the vehicle jack.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

DESCRIPTION OF THE PREFERRED EMBODIMENTS

Figure 1:
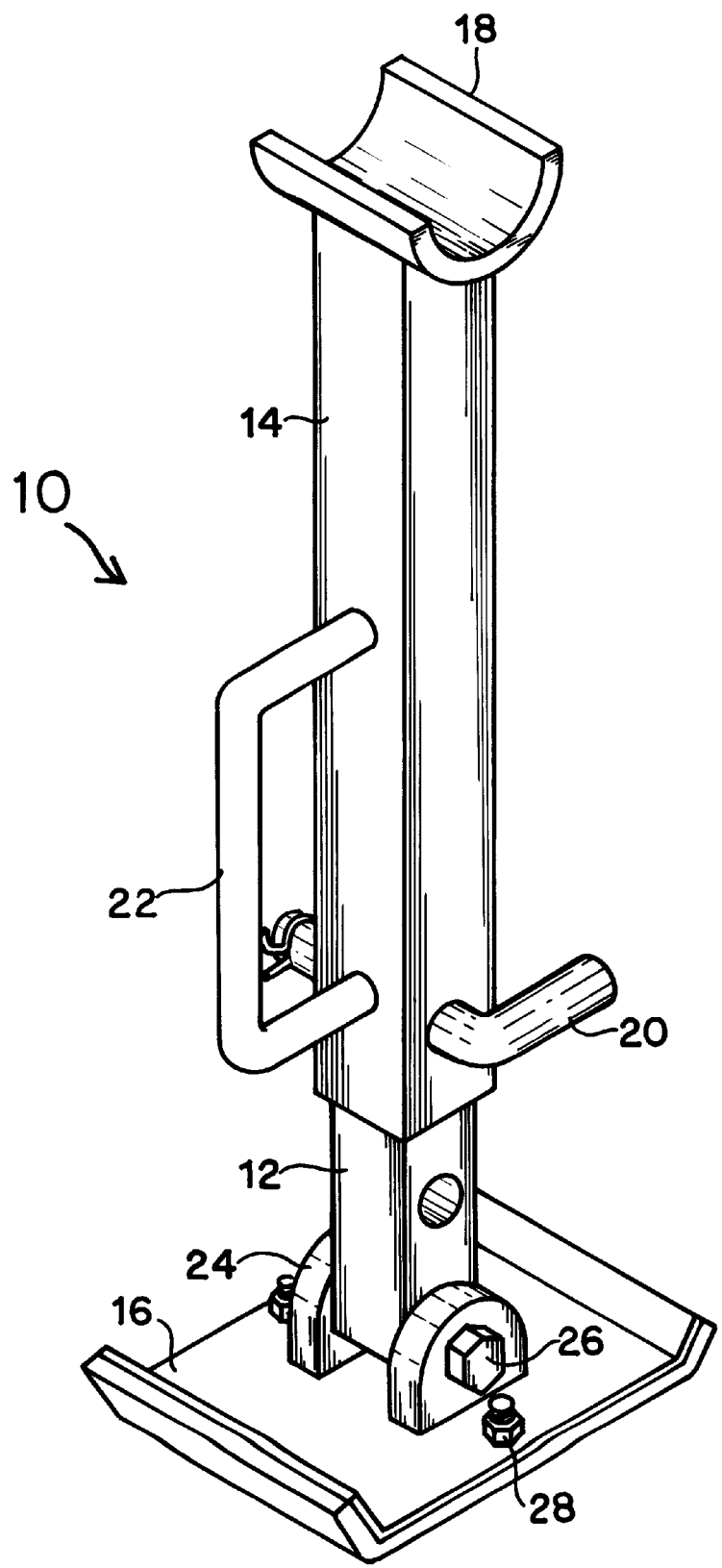
FIG. 1 is a perspective view of the vehicle jack.

The preferred embodiment of the invention is shown in the figures. FIG. 1 is a perspective view of the device. Referring to FIG. 1, vehicle jack 10 is shown. Vehicle jack 10 is preferably made of steel, but other materials of suitable strength characteristics can also be used. The vehicle jack 10 shown in FIG. 1 includes an inner support tube 12, outer support tube 14, base plate 16, axle contact bracket 18, height selection pin 20, handle 22, hinge connection brackets 24, hinge bolt 26 and spike projections 28.

Figure 5:
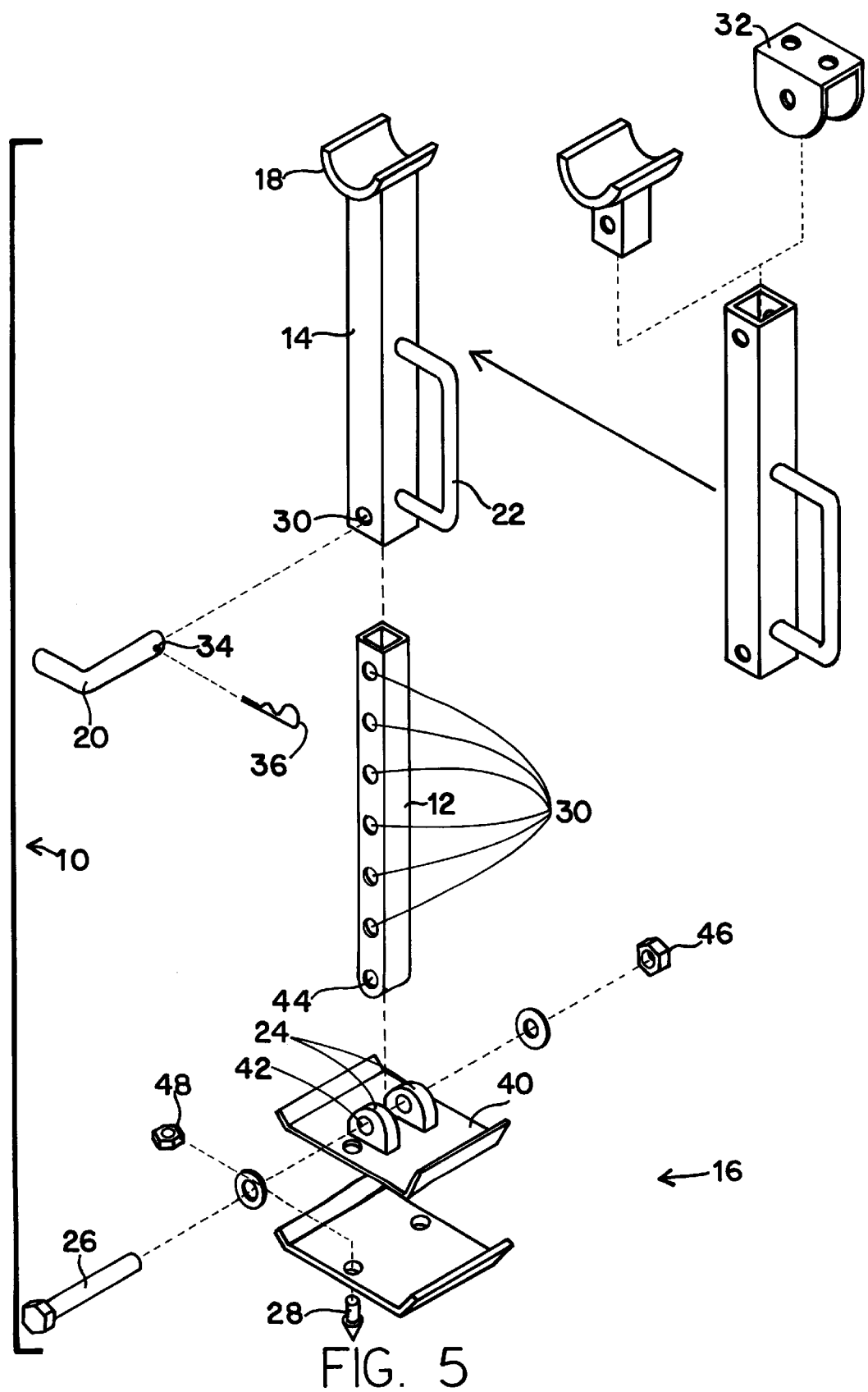
FIG. 5 is an exploded perspective view of the vehicle jack showing two versions of the axle contact bracket.

As best shown in FIG. 5, inner support tube 12 is generally straight, and is preferably a square, steel tube. It includes height selection holes 30 on two opposing sides of the tube. Outer support tube 14 is also straight and is a square steel tube. On one end of outer support tube 14 is a pair of height selection holes 30 on opposing sides of the tube. On one side of outer support tube 14 is a handle 22. At the end of outer support tube 14 which is opposite the height selection holes 30 is located an axle contact bracket 18.

In a second preferred embodiment of the invention, the axle contact bracket 18 can be flat with bolt holes, as shown in FIG. 5 at 32. In this version of the invention, a U-shaped bolt is passed around the axle and bolted into the flat axle contact bracket 32. In this or the first preferred embodiment of the invention, outer support tube can be removably attached to either an axle contact bracket 18 or a flat axle contact bracket. As shown in FIG. 5, height selection pin 20 has a hole 34 through which a wire key 36 passes to lock height selection pin 20 in place. As seen in FIG. 5, base plate 16 includes a road contact surface 38, which is rubber in the preferred embodiment. Other embodiments within the inventive concept of the invention could include other non-slip road contact surfaces, such as textured metal or durable plastic. This rubber road contact surface 38 is bonded, bolted, or otherwise attached to the metal plate 40 of base plate 16. On the metal plate 40 are attached two hinge connection brackets 24. Each of these have a hole 42 through which the hinge bolt 26 passes, and is screwed. Hinge bolt 26 also passes through hinge hole 44 of the inner support tube 12, and through the second hinge connection bracket 24. It is bolted into place with hinge bolt 26. In base plate 16 is mounted spike projection 28, which is bolted in place with spike nut 48.

Figure 4:
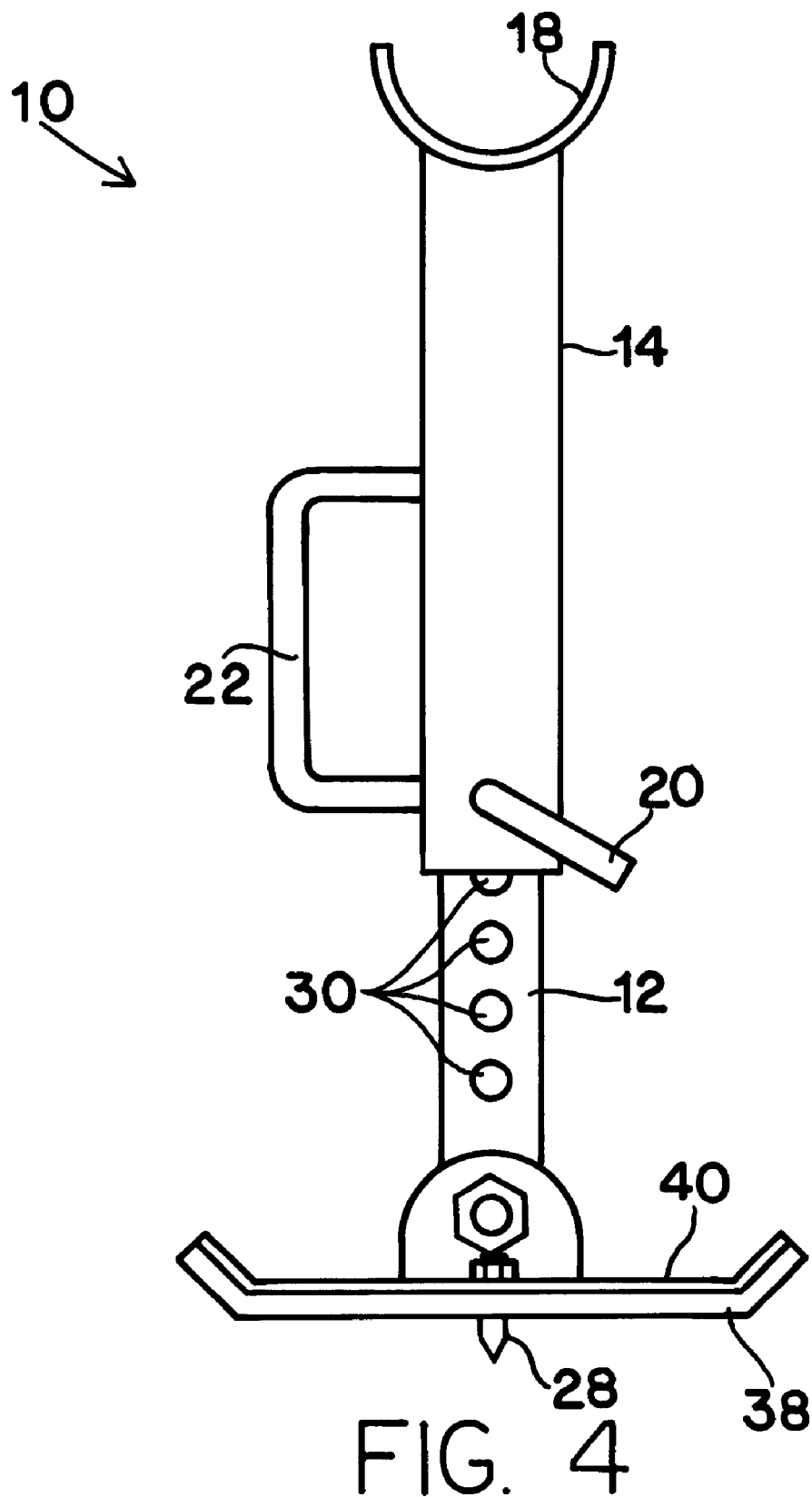
FIG. 4 is a side view of the vehicle jack.

The vehicle jack is assembled by bolting inner support tube 12 to base plate 16, using hinge bolt 26, which passes through hinge connection brackets 24 and hinge hole 44 on the inner support tube 12. Hinge nut 46 locks this assembly in place. Next, outer support tube 14 is slid over inner support tube 12, and adjusted to a height which will lift the axle of a vehicle one or more inches off of the ground. At the selected height, height selection holes 30 are aligned in the inner support tube 12 and the outer support tube 14, and height selection pin 20 is passed through the four holes. Key 36 then is passed through the hole in height selection pin 20 to lock this unit in place. FIG. 4 shows a side view of the vehicle jack thus assembled.

Figure 2:
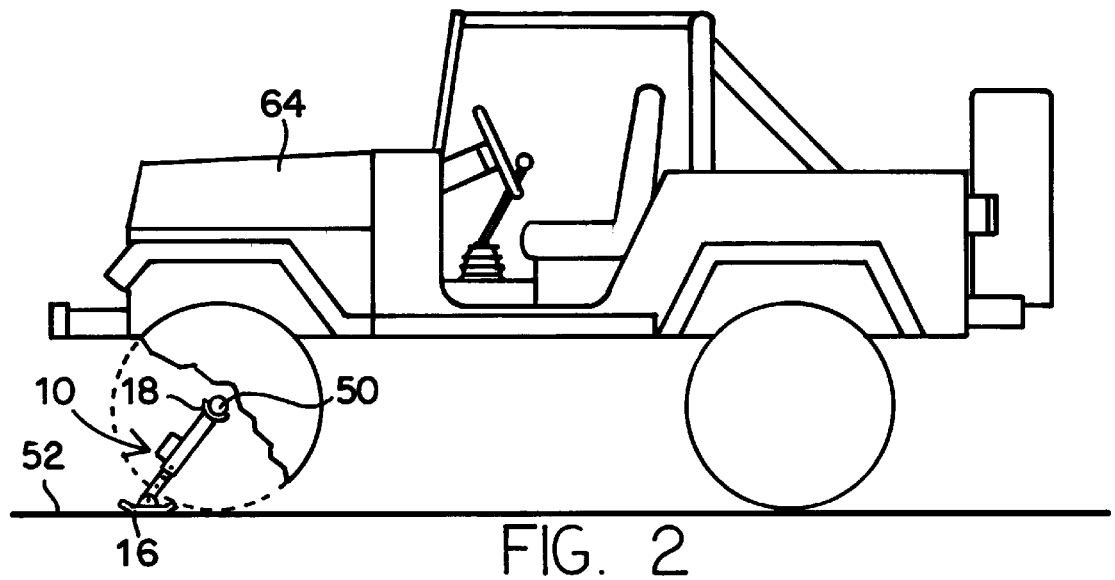
FIG. 2 is a side view of the vehicle jack placed in a non-supporting position on a vehicle axle.
Figure 3:
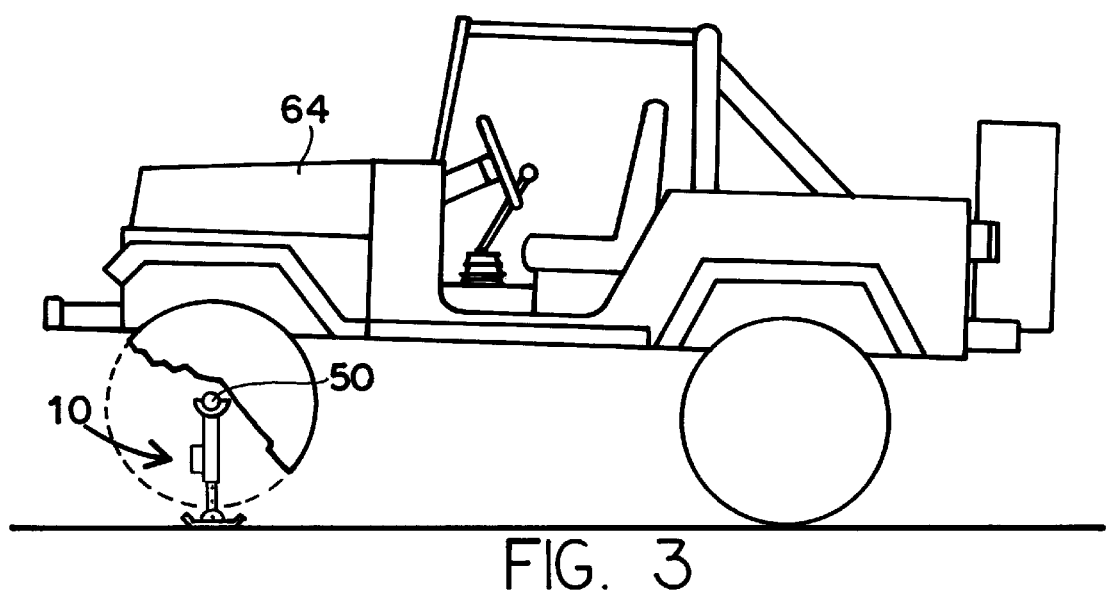
FIG. 3 is a side view of the vehicle jack placed in a supporting position on a vehicle axle.

The jack is shown in use in FIGS. 2 and 3. Before use, the jack is placed at an angle against a vehicle axle 50, as in FIG. 2. In this position, the axle contact bracket 18 is in firm contact with the vehicle axle 50, and the base plate 16 is in firm contact with the road surface 52. If the road surface 52 is particularly slippery, spike projections 28 can be added to the base plate 16. These can be used on icy roads, dirt roads, gravel roads, or snowy roads. With the vehicle jack 10 thus in place, the vehicle is driven forward a short distance under its own engine power. This distance will be typically six or eight inches. After driving forward six or eight inches, the vehicle will be in a supported position with the vehicle axle 50 on or supported by the vehicle jack 10, as shown in FIG. 3.

This device is particularly adapted for use on four-wheel drive vehicles, since with a four-wheel drive vehicle it can be used on either the front or the rear axle, and the vehicle has the power to push itself up on the jack. By placing the jacks on the axle near any of the wheels, that particular wheel can be lifted free of the road surface for changing a tire. This vehicle jack could also be used to lift the axles of other vehicles, such as horse trailers, tractor trailers, farm implements, utility trailers, or any vehicle axle where motive power to the vehicle is supplied by another axle.

Figure 6:
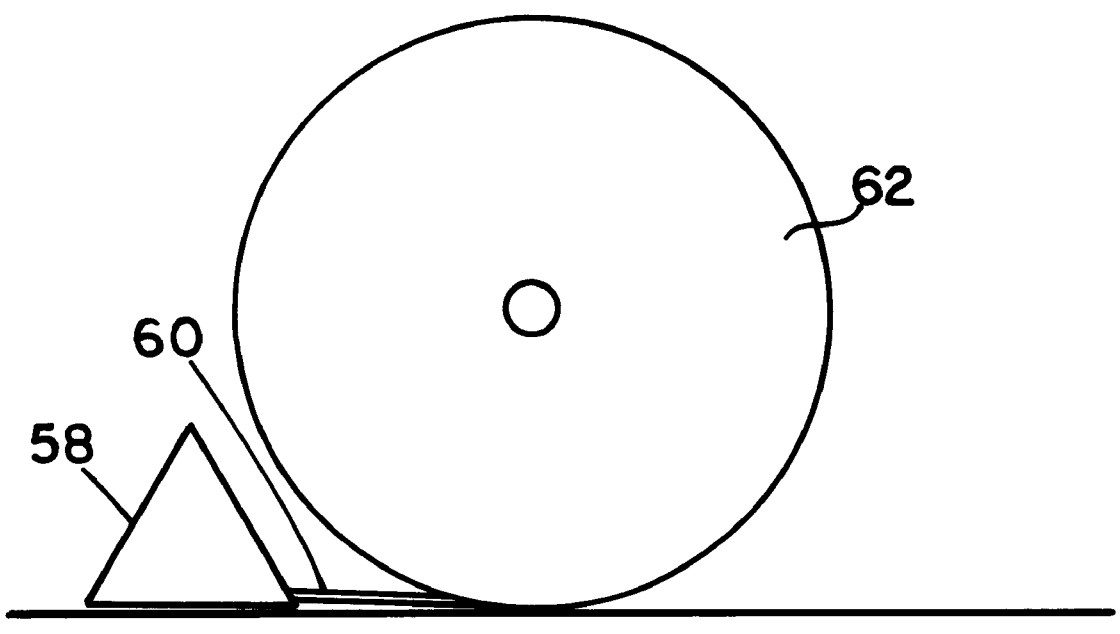
FIG. 6 is a side view of a wheel chock in a version of the vehicle jack which uses a wheel chock.

FIG. 6 is a third preferred embodiment which utilizes the vehicle jack 10 of the first, second, or third embodiment, combined with a wheel chock 58, which is shown in FIG. 8. Wheel chock 58 can have a spacing bar 60, which is used to gauge the distance the vehicle must travel forward in order to put the vehicle axle 50 directly over the base plate 16. This distance is first measured on the axle 50 to which the vehicle jack 10 is attached, by measuring the distance from the center of the base plate 16 to the point directly below the vehicle axle 50. That distance is transferred by the use of the spacing bar 60 to the axle not being lifted. Thus, when the vehicle moves forward that distance, the vehicle wheel 62 will contact the wheel chock 58, and stop the motion of the vehicle 64. The wheel chock 58 and the spacing bar 60 thus are an optional way of preventing over or under rotation of the vehicle jack 10.

While there is shown and described the present preferred embodiment of the invention, it is to be distinctly understood that this invention is not limited thereto but may be variously embodied to practice within the scope of the following claims.

I claim:

1. A vehicle jack for lifting any one wheel from a position under an axle of a four wheel drive vehicle using leverage and in response to movement of said vehicle in relation to a road surface, which is removable from contact with said vehicle for storage and for use on other axles, comprising:

a straight inner support tube for support of a vehicle axle from directly below said axle, with height selection holes, hingedly attached to a base plate and adjustably inserted in an outer support tube;

a base plate for contacting a road surface, with a pair of hinge connection brackets, for hinged attached to said inner support tube, and a road contact surface for non-slipping contact with said road surface, for supporting an axle of a vehicle from directly below said axle;

a straight outer support tube adjustably inserted over said inner support tube, with height selection holes which can be aligned with said height selection holes of said inner support tube, said outer support tube also including a handle for height adjustment and carrying, and which when linked with said inner support tube, forms a straight arm which can be positioned by rotation directly below an axle of said vehicle for lifting said vehicle;

a curved axle contact bracket connected to said straight outer support tube, for contacting an axle of said vehicle and rotating to a support position directly under said axle; and a height selection pin, for removable insertion in said height selection holes of said inner support tube and said outer support tube, with a locking device.

2. The vehicle jack of claim 1 which further comprises a base plate with removable spike projections for resistance to slipping on said road surface.

3. The vehicle jack of claim 1 which further comprises a base plate with rubber road contact surface.

4. The vehicle jack of claim 1 in which said locking device for said height selection pin comprises a hole and a securing pin.

5. A vehicle jack for lifting any one wheel from a position under an axle of a four wheel drive vehicle using leverage and in response to movement of said vehicle in relation to a road surface, which is removable from contact with said vehicle for storage and for use on other axles, comprising:

a straight inner support tube for support of a vehicle axle from directly below said axle, with height selection holes, hingedly attached to a base plate and adjustably inserted in an outer support tube;

a base plate for contacting a road surface, with a pair of hinge connection brackets, for hinged attached to said inner support tube, and a road contact surface for non-slipping contact with said road surface, for supporting an axle of a vehicle from directly below said axle;

a straight outer support tube adjustably inserted over said inner support tube, with height selection holes which can be aligned with said height selection holes of said inner support tube, said outer support tube also including a handle for height adjustment and carrying, and which when linked with said inner support tube, forms a straight arm which can be positioned by rotation directly below an axle of said vehicle for lifting said vehicle;

a curved axle contact bracket connected to said straight outer support tube, for contacting an axle of said vehicle and rotating to a support position directly under said axle;

a height selection pin, for removable insertion in said height selection holes of said inner support tube and said outer support tube, with a locking device; and a wheel chock for placement with a wheel to limit said movement of said vehicle.

6. The vehicle jack of claim 5 which further comprises a base plate with removable spike projections for resistance to slipping on said road surface.

7. The vehicle jack of claim 5 which further comprises a base plate with rubber road contact surface.

8. The vehicle jack of claim 5 in which said locking device for said height selection pin comprises a hole and a securing pin.

9. A vehicle jack for lifting any one wheel from a position under an axle of a four wheel drive vehicle using leverage and in response to movement of said vehicle in relation to a road surface, which is removable from contact with said vehicle for storage and for use on other axles, comprising:

a straight inner support tube for support of a vehicle axle from directly below said axle, with height selection holes, hingedly attached to a base plate and adjustably inserted in an outer support tube;

a base plate for contacting a road surface, with a pair of hinge connection brackets, for hinged attached to said inner support tube, and a road contact surface for non-slipping contact with said road surface, for supporting an axle of a vehicle from directly below said axle;

a straight outer support tube adjustably inserted over said inner support tube, with height selection holes which can be aligned with said height selection holes of said inner support tube, said outer support tube also including a handle for height adjustment and carrying, and which when linked with said inner support tube, forms a straight arm which can be positioned by rotation directly below an axle of said vehicle for lifting said vehicle;

a flat axle support bracket connected to said straight outer support tube, said flat axle support bracket comprising a flat surface having a plurality of bolt holes which clamp on to said axle by use of a U-shaped bolt which surrounds the axle and bolts to the flat axle support bracket; and a height selection pin, for removable insertion in said height selection holes of said inner support tube and said outer support tube, with a locking device.

10. The vehicle jack of claim 9 which further comprises a base plate with removable spike projections for resistance to slipping on said road surface.

11. The vehicle jack of claim 9 which further comprises a base plate with rubber road contact surface.

12. The vehicle jack of claim 9 in which said locking device for said height selection pin comprises a hole and a securing pin.

* * * * *